Patented June 12, 1951

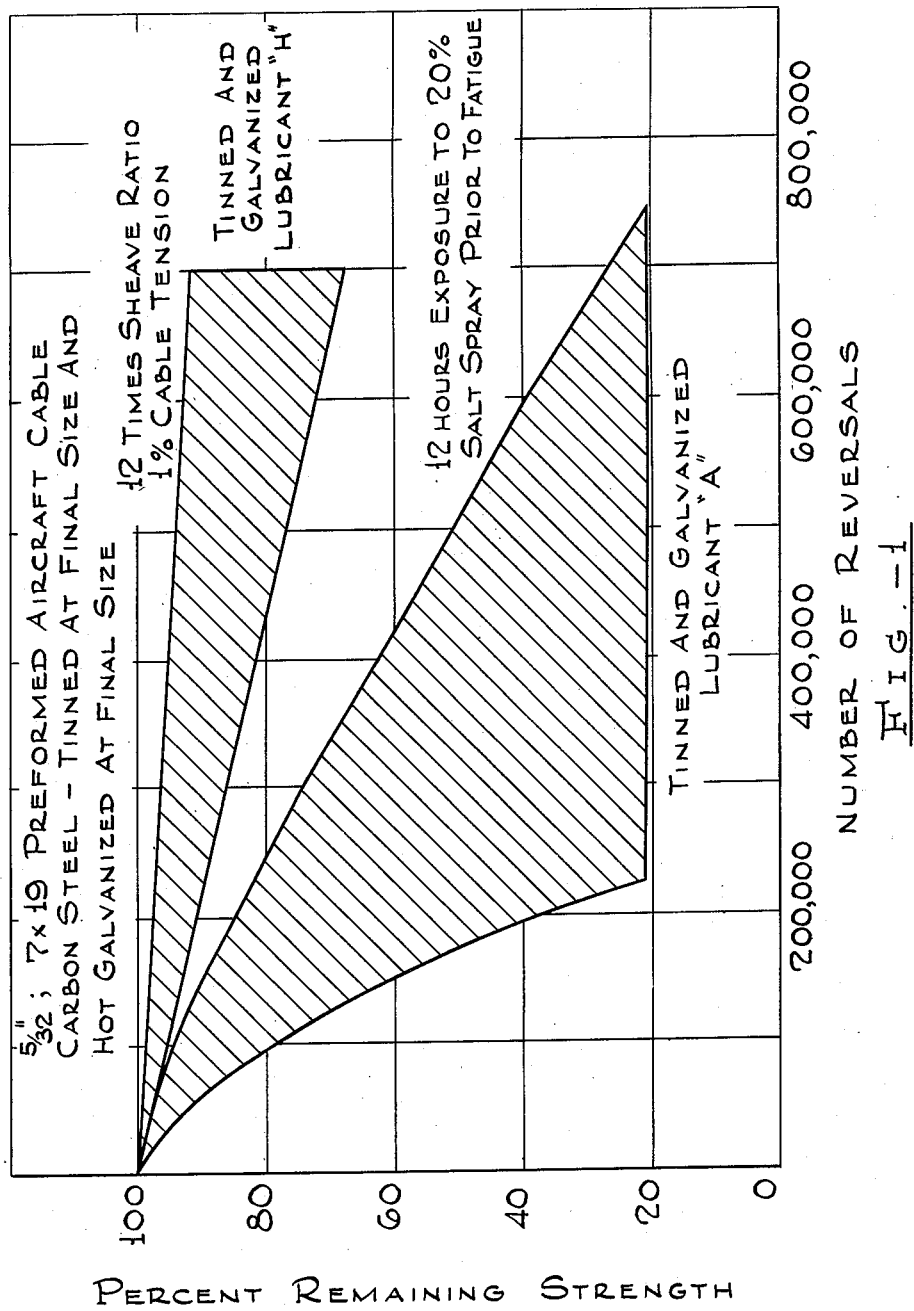

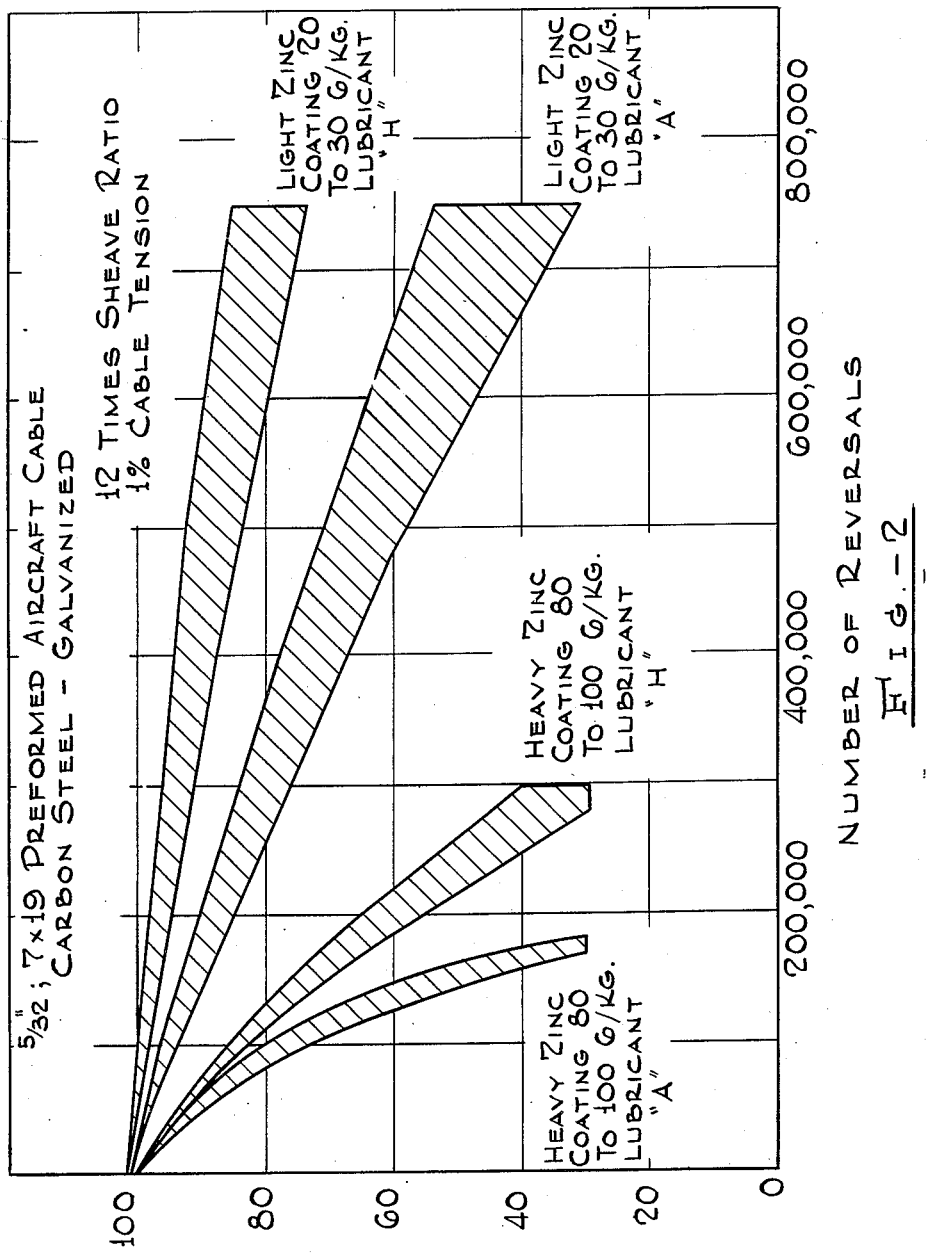

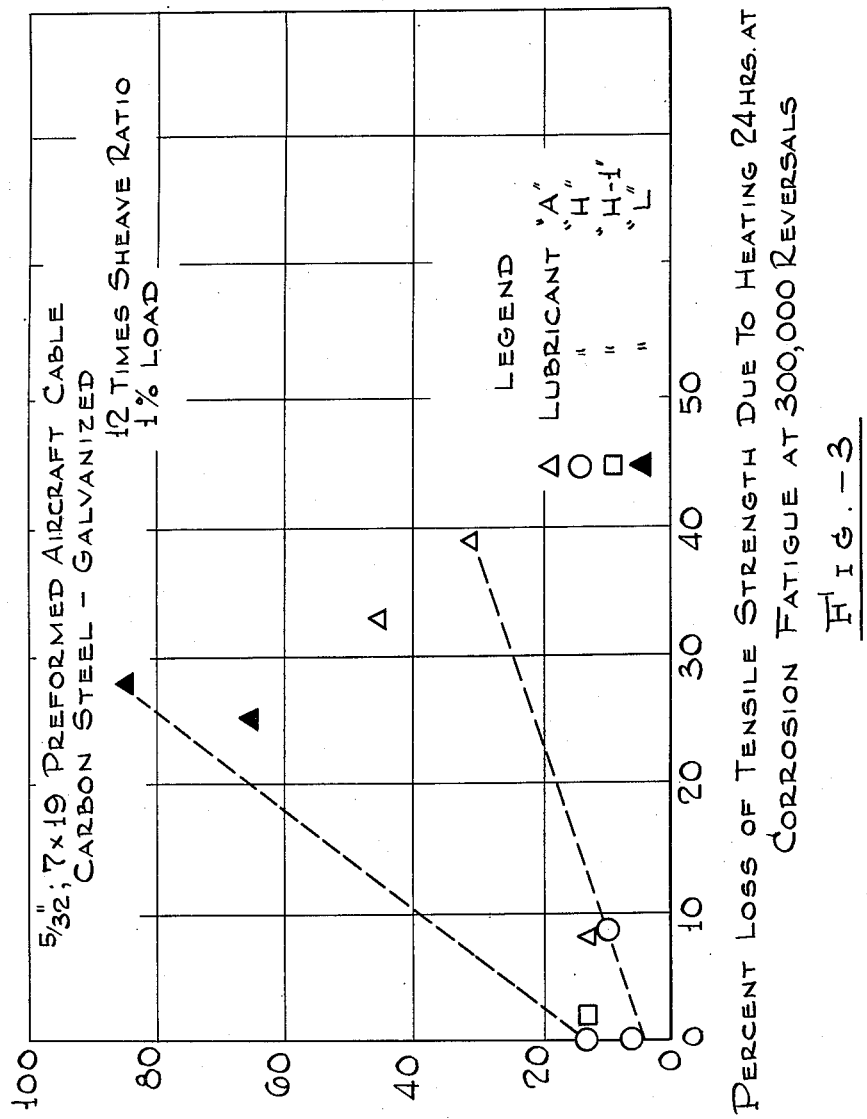

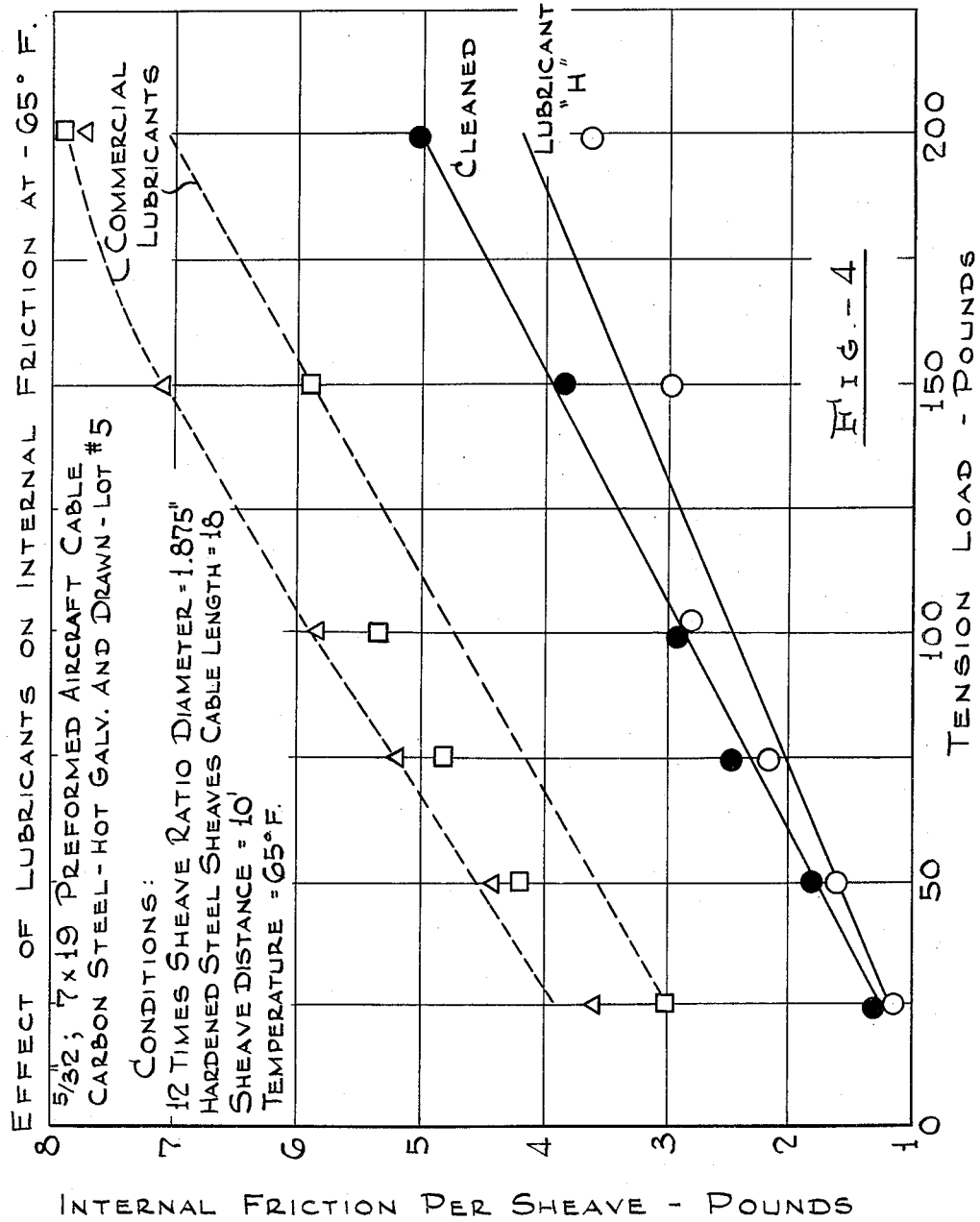

2,556,289

UNITED STATES PATENT OFFICE 2,556,289

WIRE ROPE LUBRICANT

Arnold J. Morway, Rahway, and John C. Zimmer, Union, N. J., assignors to Standard Oil Development Company, a corporation of Delaware Application December 27, 1949, Serial No. 135,142

4 Claims. (Cl. 252—33.3)

The present invention relates to wire rope lubricants and, particularly, to improved lubricating compositions which have particular merit for the internal lubrication of wire ropes and cables.

The lubrication of wire ropes and cables presents peculiar problems because these products must be protected against internal corrosion and internal friction by a lubricating material which does not exude too freely, which is not subject to excessive evaporation, and which, at the same time, affords adequate lubrication between the relatively movable fibers or wires and protects them against the elements.

In the prior art, various compositions have been proposed for the lubrication of wire ropes and cables and some of these at least have been moderately successful for use at ordinary temperatures. Particular problems have arisen, however, in the lubrication of cables which are subjected to extremes of temperatures. Thus, the control cables used in aircraft are subjected at times to extremely low temperatures and inasmuch as their proper operation is extremely vital, and the metals themselves are subject to increased fatigue at lower temperatures, considerable difficulty has arisen in securing their proper lubrication and operation. Prior art lubricants, in general, have not been sufficiently effective at very low temperatures to reduce the internal friction of cables sufficiently or to improve their corrosion life and their fatigue life. Also, on flexing at low temperatures, prior art lubricants and coatings tend to become brittle and chip or flake off. Aircraft control cables are frequently subjected to temperatures as low as —65° F., or lower, and the usual available lubricants of the prior art are quite ineffective at such temperatures.

When wire cables of any usual type are passed around sheaves, pulleys, and the like, of relatively small radius of curvature, extremely high unit stresses are imposed on the individual wires which compose them. These unit stresses may exceed 100,000 pounds per square inch in extreme cases and inasmuch as the flexing of such cables involves relative movement between the wires which compose them, extremely high frictional resistance to flexure may be encountered. For this reason, it is quite essential that cable lubricants have extreme pressure characteristics and good oiliness properties.

Wire ropes and cables which are exposed are commonly subjected to all kinds of climatic conditions and by reason of their open woven structure they are particularly susceptible to rust. Rust not only destroys the cables, or greatly shortens their useful lives, but it greatly increases the internal friction, and a satisfactory lubricant should prevent internal rusting as fully as is practicable.

Some wire ropes and cables are formed with a soft center of hemp, or other fibrous materials, and a common method of lubrication is to saturate the soft core with a lubricant which will continue to be passed out through the outer layers of wire by capillary action during the life of the cable, at such a rate that internal friction is minimized and rust and wear are reduced as far as possible. A satisfactory lubricant for this purpose should not be too fluid, in order that it may not be lost by capillary action at too rapid a rate. Obviously, it should not be too volatile either. At the same time, it should retain certain plasticity or fluidity at low temperatures, especially for application to aircraft control cables.

It is an object of the present invention to meet the foregoing requirements in a new and improved lubricating composition especially designed for cable lubrication.

The preferred composition comprises a lubricating oil, preferably a mineral base oil of about 35 to 200 S. S. U. viscosity at 210° F. with a thickener, a rust inhibitor, an extreme pressure additive and a stabilizer. The thickener preferably consists of about 3 to 15% by weight, based on the total composition, of an alkali metal soap of $C_{12}$ to $C_{22}$ fatty acids, the saturated or substantially saturated fatty acids within this range being particularly preferred although some unsaturated acid may be permitted. As a rust inhibitor, a combination of an oil-soluble petroleum sulfonate and an animal wax or ester such as degras is preferred, for example, 1 to 5% by weight, based on the total composition, of sodium petroleum sulfonate of at least 350 and preferably 400 or higher molecular weight combined with 1 to 5% of degras. Degras is an ester wax wherein the alcohol constituent is a mixture of sterols. Hydroxylated acids are also represented. Conventional rust inhibitors such as sodium nitrite may also be incorporated in small proportions if desired, but they are not ordinarily considered necessary.

The extreme pressure additive is preferably one of good oiliness characteristics and very low corrosivity. Lead oleate may be added, if desired, in proportions of 1 to 10% by weight of the total composition, along with 1 to 20% of a sulfurized oily product such as sulfurized hydrocarbons, fatty oils, ester waxes, etc., especially sulfurized sperm oil, sulfurized terpenes, and the like, provided they are not corrosive to ferrous metals. The sulfurized products, especially sulfurized sperm oil, are specifically preferred and may be used in proportions of 1 to 20%, 3 to 12% being preferred.

A preferred stabilizer comprises a small amount, for example, 0.15 to about 2% by weight, based on the total composition, of an amphoteric metal soap, for example, zinc naphthenate, or aluminum naphthenate. The zinc naphthenate is preferred, proportions of about 0.5% being specifically recommended. A combination of about 0.5% each of zinc naphthenate and aluminum naphthenate is very satisfactory. Combined with the stabilizer, there is preferably employed a conventional antioxidant such as phenyl alpha naphthylamine or phenyl beta naphthylamine in proportions of 0.1 to about 1% by weight. Generally speaking, the phenyl alpha naphthylamine is preferred, proportions of 0.25% by weight being specifically recommended.

The invention will be more fully understood by reference to the following specific examples and the data accompanying them.

*Example I*

A cable lubricant was prepared using 18.06% mineral oil of 40 S. S. U. viscosity at 210° F. combined with 60.4% by weight of a mineral oil of 70 S. S. U. viscosity at the same temperature. To this was added 6.21% of hydrogenated fish oil acids sold under the trade name "Hydrofol Acids 51 H. O." 1.11% by weight of commercial lithium hydroxide, containing 54% LiOH (the remainder being water of crystallization, largely) was added to saponify the fatty acids in the oil. The soap was prepared in a conventional manner by heating with continued stirring to soap-forming temperature between about 300° F. and 400° F. The composition was a light colored grease of soft consistency. To this were added 0.48% of zinc naphthenate and 0.24% of phenyl alpha napthylamine.

On cooling the grease, a rust inhibiting composition composed of a 50–50 mixture of oil-soluble sodium petroleum sulfonate and degras was added in proportions of 6% by weight, based on the total composition, and 7.5% of a non-corrosive sulfurized sperm oil of 13% sulfur content was also added.

*Example II*

A somewhat heavier grade of lubricant than that of Example I was prepared as follows:

13.0% "Hydrofol Acids 51"
2.05% Lithium hydroxide monohydrate
0.50% Zinc naphthenate
0.50% Aluminum stearate
0.50% Phenyl alpha naphthylamine
6.00% 50–50 mixture of oil-soluble sodium sulfonate and degras
7.50% 50–50 oil solution of sulfurized sperm oil
69.95% Naphthenic type mineral oil having 500 S. S. U. vis./100° F.

The fatty acids and an approximately equal amount of oil are charged to a grease kettle. The temperature is raised to 150°–170° F. and an aqueous solution of lithium hydroxide, sufficient to saponify the fatty acids, is added. Heating and stirring are continued and when the mass becomes dry, small additions of the lubricating oil are made until the batch is completely dried out and all the oil is added. The zinc and aluminum soaps used as structure stabilizers are then added and the temperature is further raised to 400° F. where the mass becomes fluid. The oxidation inhibitor, preferably phenyl alpha naphthylamine, is then added and stirring and heating are discontinued. The grease may then be drawn out into pans for cooling, or it may be left in the kettle to cool or may be passed through a chilling mechanism. The cold grease is subsequently worked to the desired penetration and, while working the grease, the corrosion or rust preventive base, consisting preferably of oil-soluble sodium petroleum sulfonates and degras, and the extreme pressure base consisting preferably of sulfurized sperm oil, are worked into the grease mass. The final product has the following inspections:

ASTM dropping point_____°F__ 350
Penetration worked (77° F.)_____ 300

It will be noted that Examples I and II employ sulfurized sperm oil as the extreme pressure additive. These are preferred instead of conventional lead oleate but a mixture of these is quite satisfactory so long as corrosive conditions are not too severe. Obviously, the usual lubricant additives may be incorporated, such as adhesive or tackiness agents, antioxidants, viscosity index improvers, metal deactivators, and the like, as may be desired, but the essential ingredients are those shown in Examples I and II, those of Example I being specifically preferred for the more extreme conditions of temperature and corrosion.

The composition described above in Example II was prepared as a finished grease and was applied to test cables in comparison with prior art cable lubricants. The new product was a soft grease composition which, it was found, performed considerably more satisfactorily as regards internal friction, fatigue life and rust, than any of the prior art products tested. Figure 1 of the drawings shows a comparison of the properties of the lubricant of Example II ("Lubricant H") with the standard prior art cable lubricant "A" when applied to a $\frac{5}{32}$" 7 strand (19 wires per strand) preformed aircraft cable of carbon steel which was tinned and hot galvanized on final sizing. This was passed around a sheave having a diameter 12 times that of the cable with a cable tension of 1% of calculated breaking strength. As will clearly appear from the drawing, each cable was subjected to 12 hours exposure to 20% salt spray and was reversed hundreds of thousands of times before failure. The prior art lubricant "A" showed a much inferior corrosion fatigue life under the conditions indicated.

The product "H" of Example II was also tested in comparison with the standard prior art lubricant "A" at a temperature of −65° F. Cables with light zinc coating showed greater life than those with a heavy coating, as is shown in Figure 2. In both cases, however, the lubricant "H" of Example II was markedly superior to the prior art product.

Figure 3 shows a loss of lubricant due to heating to 160° F. versus corrosion and fatigue, the percentage loss of tensile strength at 300,000 reversals being indicated for four different products. Lubricants "H" and "H–1" correspond respectively to Example II and the product of Example I. Lubricant "A" is the prior art cable lubricant mentioned above, lubricant "L" is an oxidized petroleum cable coating of commercial manufacture cut back with 45% of mineral lubricating oil of 55 S. S. U. viscosity at 210° F.

Figure 4 shows comparative internal friction in cables treated with prior art lubricants, a cable devoid of lubricant, and one treated with the lubricant "H" of Example II. It will be noted that cables treated with prior art lubricant showed considerably greater internal friction than a clean unoiled cable at this low temperature of −65° F. However, a cable lubricated with the composition of Example II showed somewhat less internal friction than the oil-free cable, even at the extremely low temperature involved.

Extensive tests conducted on aircraft cables resulted in the conclusion that cables containing the lubricant "H" of Example II had considerably better corrosion-fatigue life at −65° F. than cables containing commercial lubricants. The fatigue life of cables containing the lubricant of Example II also was better at room temperature following exposure to a temperature of 160° F. for an extended period. The essential difference between Example I and II above is the lower soap content of Example I which makes it somewhat easier to handle in grease dispensing equipment. Otherwise, the two have comparable properties.

The internal friction of cables lubricated with the composition of this invention appears to be lower than cables treated with prior art lubricants at ordinary room temperatures and very considerably lower at −65° F. With the composition of the present invention, the internal friction was substantially unaffected by temperatures down to −65° F., whereas the internal friction of cables containing prior art lubricants began to increase considerably as soon as the temperature was brought below 0° F. Under all conditions, the lubricant "H" of Example II showed superior performance. This is of considerable importance when it is realized that aircraft are frequently subjected to temperatures as high as 160° F., particularly when on the ground as well as to extremely low temperatures. A cable lubricant made according to this invention has a sufficiently heavy mineral oil base that it is not evaporated unduly at temperatures of 160° F. This advantage is coupled with its highly advantageous performance at very low temperatures.

While lithium soap is preferred as the thickener for use at very low temperatures, the other alkali metal soaps are quite satisfactory when conditions are not so severe. Sodium soaps are not suitable under some atmospheric conditions due to water-solubility. The lithium soap greases are definitely preferred where cables are exposed either to the open elements or to conditions of moisture condensation.

What is claimed is:

1. A lubricating composition consisting essentially of about 6 to 13% by weight of lithium soap of substantially saturated fatty acids within the $C_{12}$ to $C_{22}$ range, 0.5% to 1% of an amphoteric metal naphthenate as a structure stabilizer, 0.25% to 0.5% phenyl alpha naphthylamine, 1 to 5% oil-soluble sodium petroleum sulfonate, 1 to 5% degras, 3.75 to 10.0% non-corrosive sulfurized sperm oil and about 65 to 87.5% of a mineral base lubricating oil.

2. A lubricating composition for wire cables, and the like, comprising a mineral base lubricating oil thickened to a grease consistency with a lithium soap of fatty acids of the $C_{12}$ to $C_{22}$ range, 0.1 to 1% of an antioxidant, 0.15 to 2% of a naphthenate soap of an amphoteric metal as a stabilizer, 1 to 5% of oil-soluble alkali metal petroleum sulfonate, 1 to 5% degras, 1 to 20% sulfurized fatty oil which is non-corrosive to ferrous metals and 0 to 10% of lead oleate.

3. Composition as in claim 2 wherein the antioxidant is a phenyl amine and the sulfonate is sodium sulfonate.

4. Composition as in claim 2 wherein the amphoteric metal soap comprises a combination of aluminum stearate and zinc naphthenate.

ARNOLD J. MORWAY.
JOHN C. ZIMMER.

REFERENCES CITED

The following references are of record in the file of this patent:

UNITED STATES PATENTS

| Number | Name | Date |
| --- | --- | --- |
| 2,162,398 | Hass | June 13, 1939 |
| 2,211,254 | Chittick | Aug. 13, 1940 |
| 2,363,013 | Morway | Nov. 21, 1944 |
| 2,382,699 | Duncan | Aug. 14, 1945 |
| 2,450,321 | White | Sept. 28, 1948 |